2,910,492

MANUFACTURE OF CYCLOPENTADIENYL MANGANESE COMPOUNDS

Jerome E. Brown, Detroit, and Earl G. De Witt, Royal Oak, Mich., and Hymin Shapiro, Baton Rouge, La., assignors to Ethyl Corporation, New York, N.Y., a corporation of Delaware No Drawing. Application July 24, 1957
Serial No. 673,763

7 Claims. (Cl. 260—429)

This invention relates to the manufacture of cyclopentadienyl manganese compounds and more particularly to the production of bis(cyclopentadienyl) manganese and cyclopentadienyl manganese tricarbonyl compounds, such as alkylcyclopentadienyl manganese tricarbonyls.

Cyclopentadienyl manganese tricarbonyl compounds have been found to be exceptionally effective antiknocks for use in fuel, for spark plug ignition internal combustion engines. These compounds not only have exceptional effectiveness as antiknocks but also many of these compounds, principally the liquid compounds, have auxiliary properties which make them entirely practical and desirable for commercial use. These auxiliary properties include high solubility in fuels, such as gasoline, and thermo-stability either alone or in gasolines which makes these compounds entirely satisfactory for use under the widely varying conditions to which gasoline and other fuels are normally subjected. Possibly of even greater importance, these compounds do not tend to form any appreciable deposits on the engine pistons, valve and spark plug surfaces and likewise are not abrasive to the engine parts as are characteristic of iron compounds.

Bis(cyclopentadienyl) manganese compounds can be produced in certain solvents, particularly ethers, by reaction of the corresponding cyclopentadienyl alkali metal compound with manganese salts. The bis(cyclopentadienyl) manganese compound can thereafter be reacted with carbon monoxide, normally in the same solvent, to produce the cyclopentadienyl manganese tricarbonyl compound. The rate of production of the desired product is relatively low, principally due to the reaction product forming highly stable gels and to the necessary presence of very large volumes of solvent which reduces substantially the throughput of the process equipment. These gels make the reaction product essentially immobile, reducing appreciably heat transfer from the reaction vessel and complicating enormously materials handling on commercial scale operation. It is accordingly very desirable to permit much greater yields of the desired product from a unit volume of equipment of reactor space and to maintain fluid reaction masses so as to substantially reduce the cost of production of these products.

It is accordingly an object of this invention to provide an improved process for the manufacture of bis(cyclopentadienyl) manganese compounds and cyclopentadienyl manganese tricarbonyl compounds. Another object is to provide a process of this type having a relatively high reaction rate and a high reactor throughput, and which avoids the formation of stable gels by the reaction mass. Still another object is to provide a process which is adapted to large scale commercial production of cyclopentadienyl manganese tricarbonyl compounds, including the intermediate steps of forming the alkali metal cyclopentadienyl compound and converting this compound to the desired bis(cyclopentadienyl) manganese compound. Other objects and advantages of this invention will become more apparent from the following description and appended claims.

It has now been found that these and other objects of the invention are accomplished if the bis(cyclopentadienyl) manganese compound and the cyclopentadienyl manganese tricarbonyl compound are produced using relatively small quantities of an ether selected from the group consisting of dialkyl glycol ethers and cyclic ethers. The quantity of ether employed in accordance with this invention is considerably below that which is normally considered "solvent" quantities, not greater than a molar equivalent based upon the reactants. It is found that these small quantities of ether unexpectedly form a type of complex with the reactants or products, giving an unusually fluid reaction medium. It has also been found, very surprisingly, that stable gels can be avoided at elevated reaction temperatures by maintaining a slight excess of manganous salt in preferably both the bis(cyclopentadienyl) manganese preparation and in the carbonylation reaction.

More specifically, the preferred process of this invention comprises reacting a cyclopentadienyl alkali metal compound with a manganous salt at a temperature above about 100° C. in a solvent selected from the group consisting of lower dialkyl glycol ethers and cyclic ethers, the equivalent mole ratio of said manganous salt to said alkali metal compound being at least 1.05:1 and said solvent being present in a concentration of not greater than 1 mole per mole of manganous salt. This reaction product is thereafter reacted with carbon monoxide at a temperature above about 150° C. in substantially the same solvent to reactant ratios.

The gel formation during the bis(cyclopentadienyl) manganese compound formation can be serious even when employing essentially stoichiometric quantities and the problem becomes progressively more serious when employing higher cyclopentadienyl alkali metal to manganese salt ratios. For example, using an equivalent mole ratio of manganous chloride to methylcyclopentadienyl sodium of only 0.9 to 1, a gel is formed at 170° C. after about 22 minutes of reaction time. While this gel can be sometimes broken by violent agitation, the reaction product frequently regels and cannot be broken with any reasonable agitation or by other known means. Obviously, aside from the undesirable reaction conditions, this reaction product is extremely difficult to discharge from a reaction vessel. In using a slight excess of manganous chloride e.g. 1.1:1 or 1.2:1, a gel sometimes forms after a very few minutes but this gel is unstable and can be broken with a relatively small amount of agitation. Likewise, it has been found that regelling is not encountered under these conditions, the reaction mass remaining highly fluid and stirrable. With higher molar ratios of manganous salt to cyclopentadienyl alkali metal compound, the gel formation can be completely avoided and the reaction mass remains highly fluid throughout the course of the reaction.

Contrary to expectations, the gel problem is more serious at elevated temperature, i.e. above 130–135° C., than it is at lower temperatures. Thus, surprisingly the gel problem can sometimes be avoided by maintaining the low temperature in the cyclopentadienyl alkali metal compound-manganous salt reaction. However, the reaction rate at low temperatures is quite slow and, in addition, subsequent carbonylation at the necessary elevated temperatures, e.g. above 150° C. usually results in gel formation anyway. Thus, in some cases, it is possible to add the additional manganous salt just prior to the carbonylation reaction, but use in both reactions of excess manganous salt is preferred.

The following are typical examples which illustrate the desirable features of the present invention. All quantities are given in weight units.

EXAMPLE I

To a reactor provided with means for agitating and heating the reactants was added 36.8 parts of diethylene glycol dimethyl ether, 103 parts of methylcyclopentadienyl sodium and 312 parts of flaked manganous chloride. Following the addition of the manganous chloride, the temperature of the reactor was about 116° C. The reactants were then gradually heated to a temperature of between 170° and 180° C. while continuously agitating the reaction mass. After about 8 minutes, the reaction mass gelled but with continued agitation, the gel broke after 2 additional minutes and thereafter continued in a highly fluid state. 94% of the manganous chloride was converted to bis(methylcyclopentadienyl) manganese. The total reaction time was 93 minutes. The reaction mass could be readily discharged from the reactor.

EXAMPLE II

Example I was repeated except that an equivalent mole ratio of only 0.9 mole of manganous chloride was employed per mole of methylcyclopentadienyl sodium. The reaction mass gelled after 22 minutes. The agitation was then increased materially in an attempt to break the gel, the reaction mass adjacent the walls of the reactor being practically immobile. After 6 minutes of violent agitation, the gel broke but even with such agitation, the reaction mass regelled at 30 minutes and could not be subsequently broken even with violent agitation.

EXAMPLE III

Example I was repeated except that 1.5 mole equivalents of manganous chloride were employed per mole of methylcyclopentadienyl sodium. In this case, no gel formed but rather the reaction mass remained highly fluid throughout the course of the reaction.

In the above examples, methylcyclopentadienyl sodium was prepared by reacting monomeric methylcyclopentadiene with sodium metal at a temperature of 105–135° C. Diethylene glycol dimethyl ether (0.47 mole) was employed as the solvent and dispersant for the sodium (1 mole). The cyclopentadiene was used in a slightly molar excess (1.1 moles) to insure complete reaction of the sodium. The sodium was liquified and dispersed with agitation and the agitation was continued during the methylcyclopentadiene addition.

The following Table I illustrates other examples of carrying out the present invention.

Table I

| Example No. | IV | V | VI | VII | VIII |
|---|---|---|---|---|---|
| Raw materials: | | | | | |
| EGD [1] | 9.5 | 9.5 | 9.5 | 9.5 | 9.5 |
| MCP [2] | 13.05 | 13.88 | 14.26 | 13.95 | 14.14 |
| Na | 3.36 | 3.36 | 3.36 | 3.36 | 3.41 |
| MnCl$_2$ | 9.15 | 9.15 | 9.15 | 9.15 | 9.11 |
| CO | 5.4 | 5.31 | 5.5 | 5.80 | 5.45 |
| Mole ratio of reactants: | | | | | |
| MCP:NA | 1.115 | 1.185 | 1.213 | 1.192 | 1.190 |
| NaR:MnCl$_2$ | 2.069 | 2.069 | 2.069 | 2.069 | 2.112 |
| Reaction temperature, ° F.: | | | | | |
| Sodium reactor | 236 | 225 | 230 | 230 | 230 |
| MnCl$_2$ reactor | 240 | 260 | 257 | 260 | 255 |
| CO reactor | 330 | 333 | 375 | 330 | 378 |
| Yields of product: | | | | | |
| RNa | 98.24 | 98.10 | 95.14 | 97.60 | 96.83 |
| R$_2$Mn | 99.74 | 100.7 | 97.62 | 99.74 | 101.77 |
| Product— | | | | | |
| From CO weight | 95.02 | 89.92 | | 98.28 | 93.01 |
| From distn | 82.90 | | | | |
| From anal | 96.63 | 90.93 | 91.81 | 81.45 | 57.34 |
| Carbonylation: Time to 98% of final yield | 1.17 | 1.33 | 1.02 | 0.97 | 1.97 |
| Carbonylation: pressure | 500 | 500 | 500 | 500 | 300 |

[1] EGD—diethylene glycol dimethylether.
[2] MCP—methylcyclopentadiene.

EXAMPLE IX

Example I was repeated except that diethylene glycol dibutyl ether was employed as a solvent and manganese chloride to methylcyclopentadienyl sodium mole equivalent ratios of 0.8, 1, 1.2 and 1.5 were employed. Conversions to bis-(methylcyclopentadienyl)manganese were obtained of 62.8%, 73.1%, 90.6% and 88.6% respectively. These tests clearly show an unexpected increase in conversion to the desired bis-(methylcyclopentadienyl)-manganese compound using ratios in excess of 1:1.

EXAMPLE X

The conversion rate in the carbonylation reaction is also materially increased when employing concentrated solutions in accordance with this invention. For example, when the procedure of Example I is repeated using tetrahydrofuran as the solvent and conducting the carbonylation reaction at 165° C. and 500 lbs. p.s.i. carbon monoxide pressure and using a mole ratio of manganous chloride to solvent of 2.5:1 and 2:1, approximately 1 hour is required to obtain 80 percent conversion and the rate of reaction thereafter is considerably lower, requiring several hours to essentially complete reaction. In contrast, when using a solvent to bis(methylcyclopentadienyl) manganese ratios of about 0.37:1, 80 percent conversion is obtained in only about 30 minutes and the reaction is essentially complete after about 1½ hours. This is surprising since at the higher solvent concentrations the rate of reaction does not appear to vary materially with varying solvent quantities.

EXAMPLE XI

Example I is repeated except that manganous bromide is employed. Generally, similar results are obtained.

EXAMPLE XII

Example I is repeated except that cyclopentadienyl sodium, n-hexylcyclopentadienyl sodium and indenyl sodium are substituted for the methylcyclopentadienyl sodium to produce the corresponding cyclopentadienyl manganese compounds. Satisfactory yields of these products are obtained.

The following Table II illustrates other variations of the process of this invention. In all of these examples, the corresponding cyclopentadienyl manganous tricarbonyl compound is formed in good yield.

Table II

| Example | RM | MnX | Solvent | Equiv. MnX/RM | Solvent/MnX | T.,°C. 1 | T.,°C. 2 | CO pressure, p.s.i.g. |
|---|---|---|---|---|---|---|---|---|
| XIII | Cyclopentadienyl lithium | MnBr₂ | Tetrahydrofuran | 1.12 | 0.7 | 110 | 165 | 400 |
| XIV | Ethylcyclopentadienyl potassium | MnCl₂ | Ethylene glycol diethyl ether | 1.4 | 0.4 | 140 | 190 | 300 |
| XV | Indenyl sodium | MnCl₂ | Tetraethylene glycol dimethyl ether | 1.6 | 0.65 | 120 | 175 | 600 |
| XVI | Fluorenyl sodium | MnSO₄ | Diethylene glycol dimethyl ether | 1.05 | 0.9 | 68 | 180 | 800 |
| XVII | Methylcyclopentadienyl sodium | MnCl₂ | ......do.............. | 1.1 | 0.35 | 200 | 190 | 300 |

EXAMPLE XVIII

In Example XVII the methylcyclopentadiene sodium is produced using methylcyclopentadiene dimer. The dimer depolymerizes under reaction conditions and reacts simultaneously with sodium. At 200° C., the dimer has an appreciable cracking rate to the monomer. Temperatures as low as 160° C. give slower reaction rates whereas temperatures above about 250° C. result in some attack of the solvent by the sodium, although providing a high rate of reaction.

In all the above examples, the cyclopentadienyl manganese tricarbonyl compound is recovered from the reaction product by distillation in the presence of an aromatic hydrocarbon liquid having an initial boiling point of above about 160° C. (atmospheric pressure). The overhead from the distillation is separated into separate cuts, the first cut usually contains low boiling materials, predominantly the cyclopentadiene hydrocarbon; the second cut is normally predominantly the solvent; and the third cut is predominantly the manganous carbonyl product.

The purified methylcyclopentadienyl manganous tricarbonyl compound when mixed with gasoline increases appreciably the octane rating of the gasoline. The following Table III illustrates the effectiveness of methylcyclopentadienyl manganous tricarbonyl, using a commercial gasoline having an initial boiling point of 94° F. and a final boiling point of 390° F. The antiknock value of the fuel determined by the ratings is given in octane numbers for figures below 100 and in Army-Navy performance numbers for values above 100. The method of determining performance numbers is explained in the booklet, "Aviation Fuels and Their Effect Upon Engine Performance," NAVAER-06-5-501, USAF T.O. No. 06-5-54, published in 1951.

Table III

COMMERCIAL GASOLINE HAVING AN IBP OF 94° F. AND AN FBP OF 390° F.

| $C_5H_7Mn(CO)_3$, g. metal/gal. | Octane rating |
|---|---|
| 0 | 83.1 |
| 1.0 | 92.7 |
| 2.0 | 95.8 |
| 3.0 | 98.0 |
| 5.0 | 102.0 |

Many bis(cyclopentadienyl) manganese and cyclopentadienyl tricarbonyl compounds can be produced in accordance with the present invention in addition to those given in the above examples. In general, cyclopentadienyl or substituted cyclopentadienyl compounds containing a total of from about 5 to 20 carbon atoms can be produced by this invention. The cyclopentadienyl radical can be alkyl substituted or can be of the indenyl or fluorenyl, including the alkyl derivatives of the latter type compounds. The preferred cyclopentadienyl manganese compounds of this invention contain cyclopentadienyl radicals having from 5 to 13 carbon atoms. Typical examples are bis(cyclopentadenyl) manganese, bis(methylcyclopentadienyl) manganese, bis(ethylcyclopentadienyl) manganese, bis(n-octyl cyclopentadienyl) manganese, bis(indenyl) manganese, bis(fluorenyl) manganese, and bis(phenyl methylcyclopentadienyl) manganese. Typical examples of cyclopentadienyl manganese tricarbonyl compounds which can be produced from the above bis(cyclopentadienyl) manganese compounds are methylcyclopentadienyl manganese tricarbonyl, cyclopentadienyl manganese tricarbonyl, n-octyl cyclopentadienyl manganese tricarbonyl, and the like.

*Cyclopentadienyl alkali metal preparation.*—Any of a number of general methods for the preparation of the cyclopentadienyl alkali metal compound can be employed, including the preparations described in British Patent 763,047 and U.S. Patent 2,777,887. These processes are conducted at relatively low temperatures, however, and have many inherent disadvantages, particularly with regard to the tendency of the sodium to agglomeration and low reaction rates. A more preferred operation uses the same ether solvents discussed in accordance with the present invention, particularly the lower alkyl glycol ether type and the cyclic type such as tetrahydrofuran. Moreover, the process is preferably carried out at temperatures above 100° C. which eliminates most of the problems of agglomeration of the sodium and of low reaction rates. When using a monomer feed, e.g., methylcyclopentadiene monomer, temperatures in the range of 100° to 140° C. are preferred. In some cases, it is desired to feed directly to the reactor the cyclopentadienyl dimer in which case the reaction is carried out at temperatures above 150° C. and preferably above 180° C.

The alkali metal and cyclopentadiene compound can be reacted in essentially stoichiometric quantities, except that it is normally desired to use a slight excess, e.g. from 5 to 20 percent, of the cyclopentadiene compound to assure complete reaction of the alkali metal.

The agitation in this reaction is not critical but should be sufficient to maintain the alkali metal in adequate dispersion.

The use of sodium as the alkali metal is preferred over lithium, potassium and the other alkali metals since it is more readily available and is considerably cheaper.

*Bis(cyclopentadienyl) manganese preparation.*—A wide variety of different manganese salts can be employed in the reaction, although the halides are more reactive than the other salts. The chloride is particularly preferred. Other suitable manganous salts include manganous bromide, manganous iodide, manganous fluoride, manganous sulfate, manganous sulfide, manganous phosphate, manganous thiocyanate, and the like.

Suitable solvents for carrying out the reaction between the alkali metal cyclopentadienyl compound and the manganese salts are ethers, alcohols and amines. The most preferred solvents are the ether types, particularly the lower glycol diglycol ethers and cyclic ethers which can be subsequently used for reaction of the manganous salts. Best results are obtained with the glycol ethers. Typical examples of suitable solvents for this example are dibutyl ether, diethylene glycol dimethyl ether, diethylene glycol ethyl ether, diethylene glycol butyl ether, ethylene glycol methylphenyl ether, propylene glycol dimethyl ether, propylene glycol diethyl ether and the like. The higher glycol ethers are sometime suitable solvents, such as tetraethylene glycol dimethyl ether, tetraethylene glycol dibutyl ether, and the like.

The quantity of solvent to be employed in this reaction can vary from about 0.2 mole of solvent per mole of bis-cyclopentadienyl manganese product up to about one mole per mole of the bis-cyclopentadienyl manganese compound. The more concentrated recipes are preferred because, in many cases, the yields are improved with the more concentrated reaction mass and the reaction product can be fed directly to the conveyor carbonylation reaction, without solvent removal. Faster reaction rates are also obtained with these solvent proportions in the carbonylation reaction.

The agitation in this reaction is not critical but is very important to obtain satisfactorily rapid reaction between the cyclopentadienyl alkali metal compound and the manganese salt. The degree of agitation, however, for a given reaction rate depends to some extent upon the temperature of the reaction. Normally, the agitation employed can range from about 0.001 to about 1.0 horsepower per gallon of reaction mixture, although, preferably, agitation of from about 0.005 to about 0.1 horsepower per gallon is employed. In general, a higher horsepower per gallon input agitation is necessary with smaller vessels.

The temperature of this reaction can vary from about 100° to 250° C. and preferably is carried out between about 125° to 200° C. The higher temperatures, e.g. above 160° C. are preferred due to the faster reaction rate obtained under these conditions.

The manganous salt to cyclopentadienyl alkali metal compound mole equivalent ratio, as noted above, is critical and should be slightly above a 1:1 ratio to avoid the formation of gels. That is, slightly greater than 0.5 mole of the manganese salt should be employed per mole of the alkali metal compound. In general, the mole equivalent ratio should be above about 1.05 mole equivalent of manganous salts per mole of cyclopentadienyl alkali metal. A preferred range is from 1.1:1 to 1.5:1. When using equivalent ratios above about 2, the quantity of by-product is increased with a resultant decrease in the desired product.

*Carbonylation reaction.*—The desired solvent type and quantity for the carbonylation reaction is similar to that discussed above with regard to the preparation of the bis (cyclopentadienyl) compound. Also, the quantity of agitation in the carbonylation reaction is also similar to the above reaction.

The temperature of the carbonylation reaction can vary from about 100° C. up to decomposition temperature of the reactants or products but generally is conducted at temperatures above about 150° C. No particular advantages are obtained with temperatures above about 250° C.

The carbon monoxide can be obtained from compounds which give up carbon monoxide under conditions of reaction but, in general, it is preferred to use gaseous carbon monoxide itself. The pressure of carbon monoxide can vary from only slightly above atmospheric pressure to several thousand pounds, e.g. 10,000 p.s.i. For economics reasons, however, it is normally desired to conduct the reaction at pressures of at least 200 p.s.i. to obtain a sufficiently high reaction rate and at pressures not greater than about 1,000 p.s.i., due to increased cost of process equipment. Normally, pressures below about 500 p.s.i. are preferred since relatively inexpensive materials of construction and methods of fabrication can be used for reactors operating below this pressure.

This application is a continuation-in-part of our co-pending applications Serial No. 325,224, filed December 10, 1952, now Patent No. 2,818,416, and Serial No. 521,364, filed July 11, 1955, now Patent No. 2,818,417.

We claim:

1. A process for the manufacture of a bis(cyclopentadienyl hydrocarbon) manganese comprising reacting a cyclopentadienyl hydrocarbon alkali metal with a manganous halide at a temperature above about 100° C. in a solvent selected from the group consisting of lower dialkyl glycol ethers and cyclic ethers, said solvent being present in a concentration of not greater than 1 mole per mole of manganous halide, the mole equivalent ratio of said manganous halide to said alkali metal compounds being at least 1.05:1.

2. A process for the manufacture of a cyclopentadienyl hydrocarbon manganese tricarbonyl comprising reacting a cyclopentadienyl hydrocarbon alkali metal with a manganous halide at a temperature above about 100° C. in a solvent selected from the group consisting of lower dialkyl glycol ethers and cyclic ethers, said solvent being present in a concentration of not greater than 1 mole per mole of manganous halide, said halide being employed in a concentration of at least 1.01 mole equivalent per mole equivalent of said alkali metal compound, and thereafter reacting the so-formed reaction product with carbon monoxide at a temperature above about 150° C.

3. The process of claim 1 wherein the solvent is diethylene glycol dimethyl ether.

4. The process of claim 1 wherein the solvent is tetrahydrofuran.

5. The process of claim 1 wherein the bis(cyclopentadienyl) hydrocarbon manganese is bis(cyclopentadienyl) manganese.

6. The process of claim 1 wherein the bis(cyclopentadienyl) hydrocarbon manganese is bis(methylcyclopentadienyl) manganese.

7. The process of claim 2 wherein the cyclopentadienyl hydrocarbon manganese tricarbonyl is methylcyclopentadienyl manganese tricarbonyl, the manganous halide is manganous chloride and the solvent is diethylene glycol dimethyl ether.

References Cited in the file of this patent

Wilkinson et al.: "Chemistry and Industry" pages 307–8, March 13, 1954.
Fischer et al.: "Zeit. Naturforsch" 9b page 618 (1954).
Birmingham et al.: "Naturwissenschaften" 42, page 96 (1955).